United States Patent Office 3,457,222
Patented July 22, 1969

3,457,222
POLY-m-CARBORANYLENESILOXANE PROCESS
Stelvio Papetti, Hamden, Conn., assignor to Olin Mathieson Chemical Corporation, a corporation of Virginia
No Drawing. Filed Oct. 24, 1967, Ser. No. 677,757
Int. Cl. C08g 33/18, 31/08
U.S. Cl. 260—46.5      6 Claims

ABSTRACT OF THE DISCLOSURE

Polymers having the formula

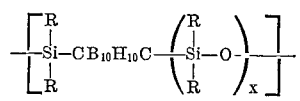

where R is alkyl or aryl and x is 1 or 3 are provided by the ferric chloride catalyzed condensation of a bis[hydroxydialkyl(or diaryl)silyl]-m-carborane, a bis[hydroxytetraalkyl(or tetraaryl)disiloxyanyl]-m-carborane or low molecular weight condensation products thereof. These polymers are useful in the preparation of high temperature resistant composites suitable for use as gaskets, bushings, etc.

---

The invention herein described was made in the course of or under a contract or subcontract thereunder, with the Department of the Navy.

This invention relates to a process for preparing high molecular weight poly-m-carboranylenesiloxanes consisting of recurring units having the formula

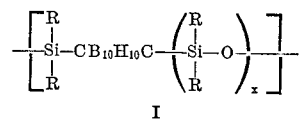

wherein R is alkyl or aryl and x is 1 or 3. More particularly, this invention relates to a catalytic process for preparing the previously described polymers from selected dihydroxy materials.

Various polymers having the Formula I have been previously prepared and reported in the literature. Thus, S. Papetti et al. in J. Polymer Science (A–1) 4, 1623–1636 (1966) disclose the preparation of poly-m-carboranylenesiloxanes wherein R is methyl. Where x is 1, the polymer is prepared by the copolymerization of 1,7-bis(chlorodimethylsilyl)-m-carborane with 1,7-bis(methoxydimethylsilyl)-m-carborane in the presence of ferric chloride. By employing tetramethyldichlorodisiloxane in the reaction with the 1,7-bis(methoxydimethylsilyl)-m-carborane, a polymer having the Formula I wherein x is 3 was obtained. While providing the desired poly-m-carboranylenesiloxanes, the aforementioned processes are subject to the disadvantage of requiring the use of two distinct beginning reactants.

Now it has been found that high molecular weight polymers having the Formula I can be readily provided by the ferric chloride catalyzed condensation of selected dihydroxy materials. Thus, polymer I where x is 1 is provided by condensing a 1,7-bis[hydroxydialkyl(or diaryl) silyl]-m-carborane having the formula

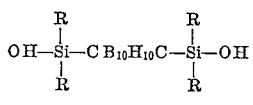

while polymer I where x is 3 is the condensation product of a 1,7-bis[hydroxytetraalkyl(or tetraaryl)disiloxanyl]-m-carborane having the formula

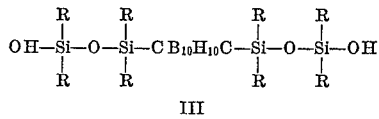

wherein R in both formulas is as previously described. Low molecular weight condensation products of dihydroxy compounds II and III can also be employed to provide the desired poly-m-carboranylenesiloxanes I.

The catalytic process of this invention is particularly surprising and unexpected since it has been previously reported by S. Papetti et al. in Inorg. Chem. 3, 1448 (1964) that 1,7-bis(hydroxydimethylsiyly)-m-carborane, compound II wherein R is methyl, resists dehydration to form a polysiloxane. Upon reinvestigation it was determined that extremely low molecular weight polymers (i.e., 1,000 to 2,000 molecular weight) could be formed in low yield on prolonged heating of 1,7-bis(hydroxydimethylsilyl)-m-carborane in Decalin with or without a catalyst. This discovery was reported by S. Papetti et al. in J. Polymer Science (A–1) 4, 1623–1636 (1966).

According to the process of this invention, polymers I having molecular weights of about 10,000 up to about 200,000 and even higher are provided by employing ferric chloride as the catalyst in the aforementioned condensation reaction. The catalytic action of ferric chloride is particularly surprising and unexpected since other catalysts such as tetramethylguanidine di-2-ethyl hexoate, trifluoroacetic acid, ammonium sulfate and sulfuric acid provide only low molecular weight condensation products. Similarly, various solvents have no effect on the production of the high molecular weight polymers of this invention.

The 1,7-bis[hydroxydialkyl(or diaryl)silyl]-m-carboranes II employed in the process of this invention are readily provided by the hydrolysis of the corresponding 1,7-bis[halodialkyl(or diaryl)silyl]-m-carboranes as described by S. Papetti et al. in Inorg. Chem. 3, 1448 (1964). Generally, the hydroylsis is carried out at a temperature of about 0 to about 150° C. A stoichiometric excess of water is employed and inert organic solvents may be used if desired. Suitable solvents include acetone; acetylacetone; acetonitrile; aromatic hydrocarbons such as benzene, toluene, xylene, etc.; aliphatic hydrocarbons such as pentane, hexane, etc.; and ethers such as diethylether, diisobutylether, etc.

Exemplificative 1,7-bis(hydroxydialkylsilyl) - m - carboranes include 1,7-bis(hydroxydimethylsilyl)-m-carborane, 1,7 - bis(hydroxydiethylsilyl)-m-carborane, 1,7-bis(hydroxydi-n-butylsilyl)-m-carborane, 1,7 - bis(hydroxydiisoamylsilyl)-m-carborane, 1,7 - bis(hydroxydi-n-propyl)-m-carborane, 1,7 - bis(hydroxydi-n-octylsilyl)-m-carborane and 1,7-bis(hydroxydi - n - dodecylsilyl)-m-carborane. 1,7-bis(hydroxydiarylsilyl)-m-carboranes which can be employed in this process include 1,7-bis(hydroxydiphenylsilyl)-m-carborane, 1,7-bis(hydroxyditolylsilyl)-m - carborane, 1,7 - bis(hydroxydixylylsilyl) - m - carborane, etc. While any 1,7-bis[hydroxydialkyl(or diaryl)-silyl]-m-carborane II can be employed in the preparation of polymers having the Formula I where x is 1, preferred embodiments of this invention employ those dihydroxy compounds II wherein R is alkyl having 1–12 carbon atoms or phenyl. Particularly preferred are the 1,7-bis(hydroxydialkylsilyl)-m-carboranes II where R is lower alkyl, i.e., alkyl having 1 to 4 carbon atoms.

Low molecular weight condensation products of the previously described 1,7-bis[hydroxydialkyl(or diaryl) silyl]-m-carboranes II can also be utilized in the preparation of polymers I where $x$ is 1. By the term "low molecular weight condensation products of 1,7-bis[hydroxydialkyl(or diaryl)-silyl]-m-carboranes II" is meant condensation products of two or more moles of compound II, up to products having an average molecular weight of about 2,000. Thus, as discussed previously, in the absence of ferric chloride, the dihydroxy compounds II can be condensed to provide products having molecular weights up to about 2,000. These condensation products are sometimes formed during the hydrolysis of the dichloro compound to the dihydroxy compound II, and the use thereof in the process of this invention obviates the necessity for controlling the aforementioned hydrolysis step. Mixtures of various condensation products, including mixtures containing the dihydroxy compound II, can also be suitably employed herein.

1,7-bis[hydroxytetraalkyl(or tetraaryl)disiloxanyl]-m-carboranes III suitable for use in the preparation of polymers I where $x$ is 3 are readily prepared by first reacting dilithio-m-carborane with the appropriate dihalotetraalkyl(or tetraaryl)disiloxane according to S. Papetti et al. in J. Polymer Science (A–1) 4, 1623–1636 (1966) to provide a 1,7-bis[halotetraalkyl(or tetraaryl)disiloxanyl]-m-carborane. Hydrolysis of this compound at a temperature between about 0° C. and about 150° C. employing a stoichiometric excess of water provides the desired 1,7 - bis[hydroxytetraalkyl(or tetraaryl)disiloxany]-m-carboranes II. Suitable compounds having the Formula II which can be employed in the process of this invention include 1,7-bis(hydroxytetramethylsiloxanyl)-m-carborane, 1,7-bis(hydroxytetraethylsiloxanyl)-m-carborane, 1,7-bis(hydroxytetraisopropylsiloxanyl) - m - carborane, 1,7-bis(hydroxytetraamylsiloxanyl)-m-carborane, 1,7-bis(hydroxytetra-n-butylsiloxanyl)-m-carborane, 1,7-bis(hydroxytetra-n-octylsiloxanyl)-m-carborane, 1,7-bis(hydroxytetra-n-nonylsiloxanyl)-m-carborane, 1,7-bis(hydroxytetraisododecylsiloxanyl)-m-carborane, 1,7-bis(hydroxytetraphenylsiloxanyl)-m-carborane, 1,7-bis(hydroxytetratolylsiloxanyl)-m-carborane, 1,7 - bis(hydroxytetraxylylsiloxanyl)-m-carborane, etc. However, preferred embodiments employ those 1,7-bis[hydroxytetraalkyl(or tetraaryl)disiloxanyl]-m-carboranes II wherein R is alkyl having 1 to 12 carbon atoms, or phenyl, and particularly the 1,7-bis(hydroxytetraalkyldisiloxanyl) - m - carboranes II where R is lower alkyl, i.e., alkyl having 1 to 4 carbon atoms.

Low molecular weight condensation products of 1,7-bis[hydroxytetraalkyl(or tetraaryl)disiloxanyl] - m - carboranes III can also be utilized in the preparation of polymers I where $x$ is 3. These condensation products are formed and employed in the same manner as the previously described condensation products of 1,7-bis[hydroxydialkyl(or diaryl)silyl]-m-carboranes II. However, since the molecular weights of the 1,7-bis[hydroxytetraalkyl(or tetraaryl)disiloxanyl]-m-carboranes III are greater than the 1,7-bis[hydroxydialkyl(or diaryl)silyl]-m-carboranes II, and the steric configurations are different, the condensation products will have higher molecular weights. Hence, the condensation products of 1,7-bis[hydroxytetraalkyl(or tetraaryl)disiloxanyl] - m - carboranes III can have average molecular weights up to about 5,000.

The ferric chloride is preferably employed in an amount from about 0.01 to about 5.0 mole percent based on the beginning dihydroxy material. However, amounts less than 0.01 mole percent can be effectively utilized. Greater amounts can also be used, but no added catalytic effect is realized at higher concentrations. By the term "ferric chloride" in the claims and specification herein is meant anhydrous chloride as well as various hydrated ferric chlorides, e.g. $FeCl_3 \cdot 6H_2O$.

The polymers I of this invention are provided by heating the appropriate dihydroxy material in the presence of ferric chloride at temperatures between about 60° and about 250° C. and preferably between about 110° and about 180° C. While the reaction proceeds in the absence of a solvent, inert diluents can be employed. Thus, aromatic hydrocarbons such as toluene, xylene, etc., as well as solvents such as Decalin and the like can be utilized in the preparation of polymers I. Where a solvent is employed, evaporation or filtration is necessary to isolate the desired polymer at the end of the reaction period. Elimination of the catalyst from the polymeric product is accomplished by washing the polymer with acetone or a mixture of acetone and concentrated hydrochloric acid.

Polymers having the Formula I wherein $x$ is 1 are solid materials having molecular weights of at least about 10,000. These polymers are soluble in selective organic solvents, and thus can be purified by recrystallization from xylene, Decalin, chlorobenzene, etc. The polymeric products having the Formula I wherein $x$ is 3 are elastomeric, generally insoluble materials having molecular weights of at least about 10,000.

The poly-m-carboranylenesiloxanes I have a variety of useful applications in areas where high temperature resistant properties are desired. Thus, they are cured by heating under pressure for about 1 to 24 hours or more in the presence of a catalyst. Pressures of from about 200 to 10,000 p.s.i. can be utilized, with pressures from about 500 to 5,000 p.s.i. being preferred. A wide variety of inorganic fillers such as silica fiber, iron oxide, titanium dioxide, etc. can be mixed with the poly-m-carboranylenesiloxanes I in an amount of from about one-half to about four times the weight of the polymer. Exemplificative catalysts include organic or inorganic peroxides such as benzoyl peroxide, urea peroxide, dicumyl peroxide, etc. which can be employed in amounts of from about 0.25 percent to about 10.0 percent based on the weight of polymer I. Further curing details for poly-m-carboranylenesiloxanes are set forth by H. Schroeder et al. in Rubber Chemistry and Technology, 39, No. 4, part 2 (1966).

For example, a composition prepared from one part by weight of the polymeric product of Example 1, two parts by weight of silica fiber and 0.1 part by weight of dicumyl peroxide dispersed in calcium carbonate is molded into a disc by pressing the composition at 2,000–3,000 p.s.i. into a two inch mold, maintaining pressure for 1–2 hours at 150° C. then for 1–2 hours at 200° C. and finally at 400° C. for 2–16 hours. The resulting cured disc is a solid, homogeneous material exhibiting excellent tensile strength and resistance to chemical solvents such as acetone. In an analogous manner, cured compositions are prepared from the polymeric products of Examples 2 and 3. Gaskets and bushings formed of these cured poly-m-carboranylenesiloxanes I are useful in applications where high temperature and pressure resistant properties are required, e.g., in aircraft motors and the like.

The following examples will serve to illustrate the process of this invention.

Example 1

1,7-bis(hydroxydimethylsilyl) - m - carborane (7.0 g.) was placed in a Petri dish and melted on a hot plate at 130°–135° C. Hydrated ferric chloride ($FeCl_3 \cdot 6H_2O$; 0.5 g.) was mixed into the melted 1,7-bis(hydroxydimethylsilyl)-m-carborane and the mixture was heated for two and one-half hours. The resulting crude solid product was ground and washed first with an acetone-concentrated hydrochloric acid mixture and then with acetone. Recrystallization from refluxing xylene provided a crystalline polymer, M.P. 245–255° C., mol. wt. 16,000 (osmometric method). The infrared spectrum was in accord with a polymer having recurring units of the formula

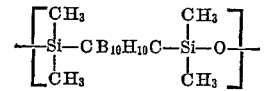

Comparative Example 1a 1,7-bis(hydroxydimethylsilyl) - m - carborane (2.7 g.) and 50 ml. of Decalin were mixed in a 100 ml. round bottom flask which was equipped with a stirring bar, a reflux condenser and a Dean-Stark trap. After refluxing for four hours, the reaction mixture was evaporated to dryness and the residue dried under vacuum at 150° C. The resulting product had a molecular weight of 1,481, corresponding to a low molecular weight polymer having 5.5 of the recurring units described in Example 1.

Comparative Example 1b

Comparative Example 1a was repeated employing xylene as the solvent and tetramethylguanidine di-2-ethyl hexoate (0.3 g.) as a catalyst. The product had a molecular weight of 1,058, indicating that a polymer consisting of 3.7 units of the formula reported in Example 1 had been obtained.

Comparative Example 1c 1,7-bis(hydroxydimethylsilyl)-m-carborane (10.0 g.) was heated without solvent and in the absence of a catalyst at 275° C. for two hours in a 100 ml. one-neck flask equipped with a condenser. Most of the starting material sublimed, while the material remaining in the flask at the end of the reaction period had a molecular weight of 525.

Example 2

1,7-bis(hydroxydiphenylsilyl) - m - carborane (5.0 g.), M.P. 153–155° C., was heated at 180–200° C. in the presence of hydrated ferric chloride (FeCl₃·6H₂O; 0.05 g.). After 45 minutes, a crystalline material was obtained in quantitative yields. The melting point of the material could not be determined employing conventional apparatus measuring melting points up and including 500° C., indicating that a polymer having a molecular weight of at least 10,000 had been obtained. Infrared analysis revealed that this material consisted of recurring units having the following formula

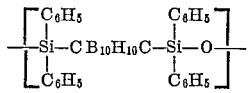

Example 3

1,7-bis(chlorotetramethyldisiloxanyl)-m-carborane was dissolved in acetone and treated with an excess of water in a 500 ml. round bottom flask. After allowing the mixture to stand overnight in an open dish, it was observed that most of the acetone had evaporated from the reaction mixture. Separation of the liquid layers provided a product having a molecular weight of 1,090. Infrared analysis and this molecular weight determination revealed that a condensation product of 1,7-bis(hydroxytetramethyldisiloxanyl)-m-carborane having about 2½ repeating units had been obtained.

A portion of this condensation product was heated on a Petri dish at 130–135° C. and then mixed with hydrated ferric chloride. After heating at 130–135° C. for one hour, an elastomeric material was obtained. The product was insoluble in such common organic solvents as acetone, benzene, o-dichlorobenzene, etc., indicating that a product having a molecular weight of at least 10,000 had been obtained. Infrared analysis revealed that the polymeric product had recurring units of the following formula.

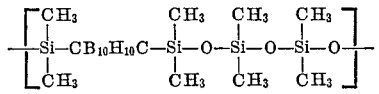

Comparative Example 3a

A portion of the condensation product of 1,7-bis-(hydroxytetramethyldisiloxanyl)-m - carborane obtained in Example 3 was mixed with 50 ml. of toluene in a 100 ml. flask equipped as in Comparative Example 1a. After refluxing for two hours, toluene was evaporated to provide a liquid residue having a molecular weight of 1,477.

Comparative Example 3b

Comparative Example 3a was repeated with the exception that benzene was employed as the solvent and trifluoroacetic acid (0.2 g.) was added as a catalyst. After refluxing for three and one-half hours, a product having a molecular weight of 4,805 was obtained. This corresponded to a low molecular weight polymer having 11.1 units of the formula shown in Example 2.

Comparative Example 3c

Following the procedure of Comparative Example 3b but employing ammonium sulfate instead of trifluoroacetic acid as the reaction catalyst, a product having a molecular weight of 4,495 and consisting of the units described in Example 2 was obtained.

Comparative Example 3d

Sulfuric acid was employed as a catalyst instead of trifluoroacetic acid in the process of Comparative Example 3b. A polymer having a molecular weight of 2,714 and consisting of the units shown in Example 2 was obtained.

Example 4

1,7-bis(chlorotetramethyldisiloxanyl) - m - carborane (10.0 g.) was added dropwise, with stirring, to 75 ml. of water at ambient temperature and the mixture refluxed for five hours. Upon cooling, a white waxy material separated from the reaction mixture. Excess water was decanted and the molecular weight of the product was determined to be 4154 (osmometric method). Infrared analysis and the molecular weight determination revealed that a condensation product of 1,7-bis(hydroxytetramethyldisiloxanyl)-m-carborane consisting of approximately 10 repeating units had been obtained.

The amount of 4.0 g. of this condensation product was heated on a Petri dish at 130–135° C. for 30 minutes and then mixed with 0.3 g. of hydrated ferric chloride. After heating on the Petri dish at 130–135° C. for 23 minutes, the reaction mixture became an elastomeric material. Infrared analysis and the following analytical data revealed that a polymeric product having recurring units of the formula of Example 3 had been obtained.

*Analysis.*—Calcd. for C₁₀H₃₄B₁₀O₃Si₄: C, 28.40; H, 8.10; B, 25.58; Si, 26.57. Found: C, 28.10; H, 8.14; B, 25.27; Si, 25.98.

The insolubility of the polymeric product in common organic solvents indicated that it had a molecular weight of at least 10,000.

What is claimed is:

1. A process for preparing a poly-m-carboranylenesiloxane having a molecular weight of at least about 10,000 which comprises heating a dihydroxy material selected from the group consisting of
   (a) a 1,7-bis[hydroxydialkyl(or diaryl)silyl]-m-carborane having the formula

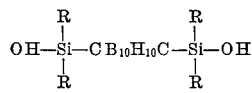

wherein R is an independently selected alkyl having 1–12 carbon atoms or phenyl;
   (b) a low molecular weight condensation product of 2 or more moles of (a) up to products having an average molecular weight of about 2,000;
   (c) a 1,7--bis[hydroxytetraalkyl(or tetraaryl)siloxanyl]-m-carborane having the formula

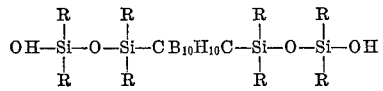

wherein R is an independently selected alkyl having 1 to 12 carbon atoms or phenyl; and
   (d) a low molecular weight condensation product of 2 or more moles of (c) up to products having an average molecular weight of about 5,000, at a temperature between about 60 and about 250° C. in the presence of a catalytic amount of ferric chloride.

2. The process of claim 1 wherein R is alkyl having 1 to 4 carbon atoms or phenyl.

3. The process of claim 2 wherein a temperature between about 110° and 180° C. is employed.

4. The process of claim 3 wherein 1,7-bis(hydroxydimethylsilyl)-m-carborane is employed as the dihydroxy material.

5. The process of claim 3 wherein a low molecular weight condensation product of 1,7-bis(hydroxytetramethyldisiloxanyl)-m-carborane is employed as the dihydroxy material.

6. The process of claim 3 wherein 1,7-bis(hydroxydiphenylsilyl)-m-carborane is employed as the dihydroxy material.

References Cited

UNITED STATES PATENTS

| | | | |
|---|---|---|---|
| 2,445,567 | 7/1948 | Elliott | 260—448.2 |
| 3,354,193 | 11/1967 | Fein et al. | 260—448.2 |
| 3,355,478 | 11/1967 | Fein et al. | 260—46.5 |
| 3,366,656 | 1/1968 | Papetti | 260—448.2 |

OTHER REFERENCES

Andrianov, "Polymers With Inorganic Main Chains," Institute of Organoelemental Compounds, Academy of Sciences, U.S.S.R., 1962, pp. 188–189. Joint Publications Research Service, translation—U.S. Dept. of Commerce Clearinghouse for Federal, Scientific, and Technical Information.

Polymer Preprints of the Division of Polymer Chemistry of the American Chemical Society, papers presented at the Atlantic City Meeting, September 1965, volume 6, No. 2, Papetti et al., pp. 1110 to 1121.

DONALD E. CZAJA, Primary Examiner

M. I. MARQUIS, Assistant Examiner

U.S. Cl. X.R.

260—2, 448.2, 606.5